United States Patent [19]

Snyder

[11] Patent Number: 4,600,301
[45] Date of Patent: Jul. 15, 1986

[54] SPINNING DISK CALIBRATION METHOD AND APPARATUS FOR LASER DOPPLER VELOCIMETER

[75] Inventor: Philip K. Snyder, Sunnyvale, Calif.

[73] Assignee: The United States of America as represented by the Administrator of the National Aeronautics and Space Administration, Washington, D.C.

[21] Appl. No.: 602,049

[22] Filed: Apr. 19, 1984

[51] Int. Cl.⁴ .................. G01P 3/36; G01N 21/00; G01S 9/00; G09B 9/00

[52] U.S. Cl. .................. 356/28.5; 356/72; 356/73; 434/4

[58] Field of Search ............. 356/72, 73, 28.5, 28; 434/4

[56] References Cited

U.S. PATENT DOCUMENTS

| | | | |
|---|---|---|---|
| 4,148,585 | 4/1979 | Bargeron et al. | 356/28.5 |
| 4,154,669 | 5/1979 | Goetz | 356/28 |
| 4,176,950 | 12/1979 | Franke | 356/28 |
| 4,190,367 | 2/1980 | Hard af Segerstad et al. | 356/354 |
| 4,227,807 | 10/1980 | Pond et al. | 356/152 |
| 4,311,383 | 1/1982 | Ohtsubo | 356/28.5 |

*Primary Examiner*—Stephen C. Buczinski
*Assistant Examiner*—Melissa Koltak
*Attorney, Agent, or Firm*—Darrell G. Brekke; John R. Manning; Robert D. Marchant

[57] ABSTRACT

A method and apparatus for calibrating laser Doppler velocimeters having one or more intersecting beam pairs. These velocimeters measure fluid velocity by observing the light scattered by particles in the fluid stream. Moving fluid particulates are simulated by fine taut wires that are radially mounted on a disk that is rotated at a known velocity. The laser beam intersection locus is first aimed at the very center of the disk and then the disk is translated so that the locus is swept by the rotating wires. The radial distance traversed is precisely measured so that the velocity of the wires (pseudo particles) may be calculated.

11 Claims, 3 Drawing Figures

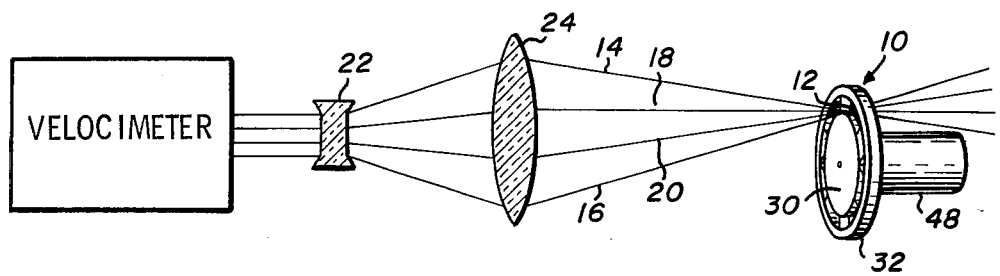
Fig_1
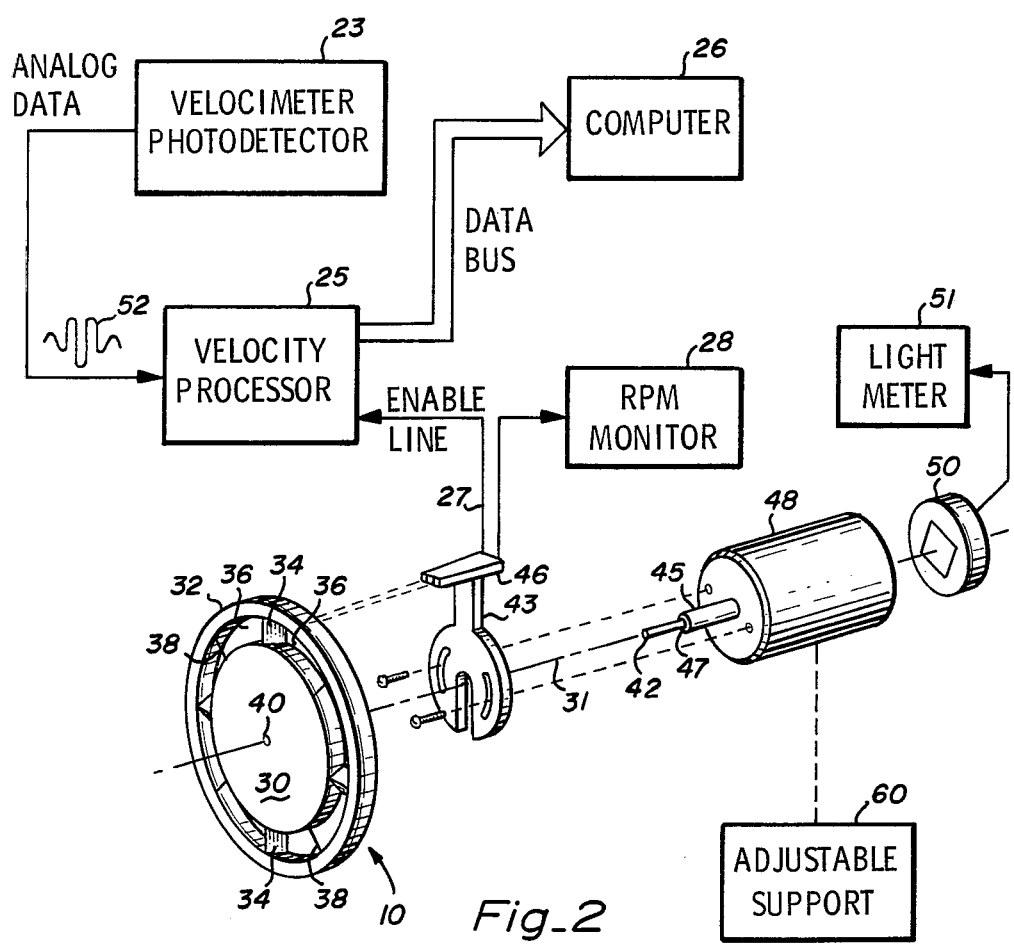
Fig_2

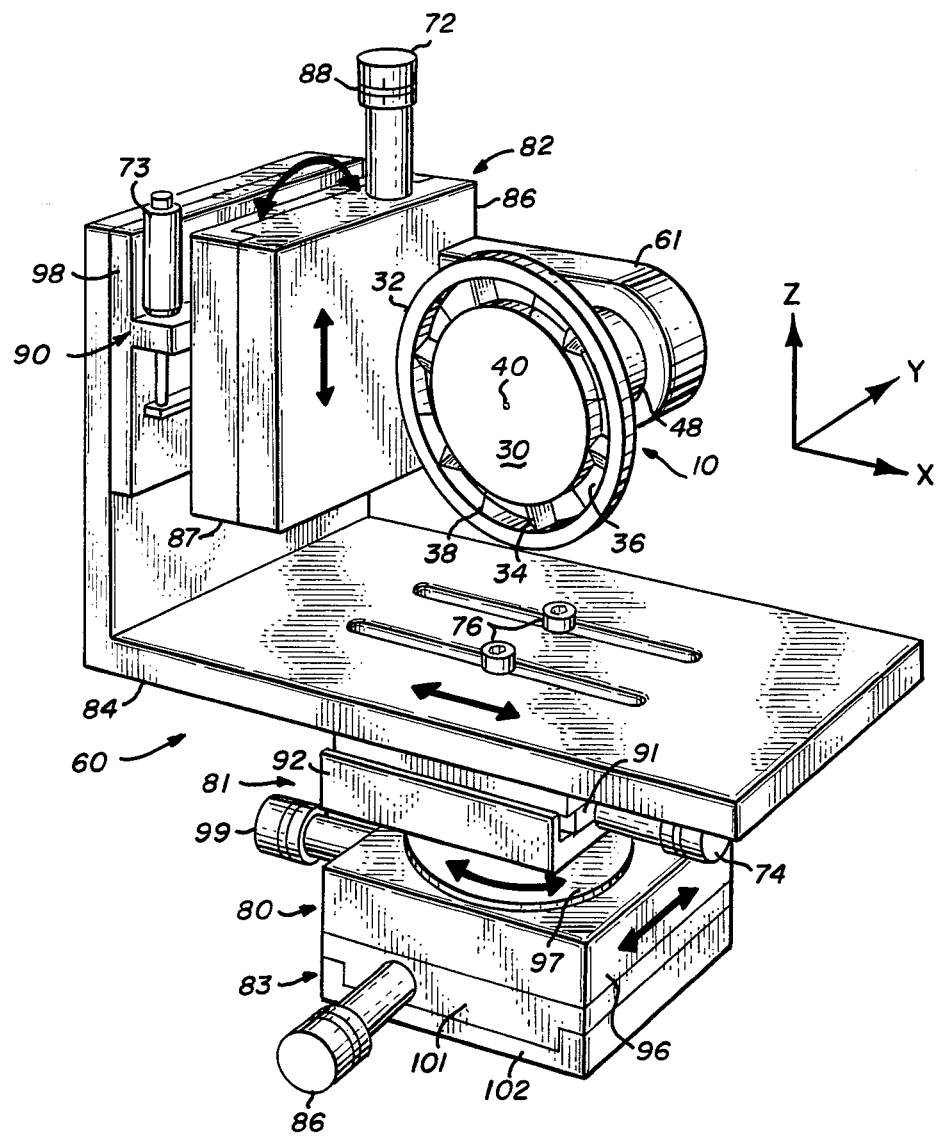
Fig_3

SPINNING DISK CALIBRATION METHOD AND APPARATUS FOR LASER DOPPLER VELOCIMETER

ORIGIN OF THE INVENTION

The invention described herein was made by an employee of the United States Government and may be manufactured and used by or for the government for governmental purposes without the payment of any royalties thereon or therefor.

BACKGROUND OF THE INVENTION

1. Field of the Invention

This invention relates generally to laser Doppler velocimeters of the type used to measure a localized fluid velocity, and more particularly, to methods and apparatus to calibrate laser Doppler velocimeters.

2. Description of the Prior Art

Laser Doppler velocimeters are used to optically measure the velocity of a fluid without disturbing the flowfield. The basic principle of the operation is the laser light scattered from entrained particles in a moving fluid will be Doppler shifted by an amount determined from the laser wavelength, the transmission and collection geometry, and the velocity of the moving fluid. Since the frequency of this scattered light is directly proportional to the velocity of particles at the scattering region, unknown velocities can readily be obtained once a calibration factor, or factors for a multi-dimensional velocimeter, for the velocimeter has been derived.

One conventional method of determining calibration constants for laser Doppler velocimeters is by direct calculation given the geometric relationships of the system. Such calculations can be accurate for extremely simple systems but become increasingly more complicated and less reliable as the complexity of the system increases. In complex laser Doppler velocimeter systems, for example, where the velocity is measured in three dimensions, or where zoom optics are employed, calculations from geometric considerations alone are impractical and give poor results.

Another calibration method involves generating a reference flowfield having a precisely predetermined velocity and directing it through the measuring volume of a laser Doppler velocimeter. While conceptually this method could result in extremely accurate calibrations, in practice the flow must be controlled by sensitive pressure regulators and transducers which may themselves have uncertain calibrations.

Another approach to calibrating laser Doppler velocimeters is to utilize a simulated flow. A spinning disk with a rough surface has been employed for such a simulation purpose. The rotating rough surface simulates the passage of small particles to the impinging velocimeter beam. A spinning disk which uses its moving surface to generate a velocity signal has two significant disadvantages. First, the signal is often distorted resulting in ambiguous zero crossings which are difficult to process. Second, the disk does not work well when impinging velocimeter beams are angles other than normal. This makes the calibration of a three-dimensional system difficult because it is necessary to obtain multiple velocity components.

The following references, all U.S. patents, describe various rotating objects used for scientific applications, only one of which applies to the calibration of a laser Doppler velocimeter. The calibrator described in that particular reference does not make any use of a spinning disk.

U.S. Pat. No. 4,148,585, issued to Bargeron et al. teaches the use of a spinning disk defraction grating in a laser Doppler velocimeter device to produce several beams of different frequency.

U.S. Pat. No. 4,154,669, issued to Goetz teaches the use of a rotating defraction grating to modulate the laser Doppler source for production of an automatic recording of mobility in an electrophoresis apparatus.

U.S. Pat No. 4,176,950, issued to Franke discloses the calibration of a laser Doppler velocimeter by the use of a rotating transparent block that refracts the light as it rotates.

U.S. Pat. No. 4,190,367, issued to Hard af Segerstad et al. teaches an apparatus for measuring the surface roughness of an object by reflecting a laser beam from its surface through a rotating defraction grating into a photodetector.

U.S. Pat. No. 4,227,807, issued to Pond et al. discloses an interferometer that uses a spinning reticle to produce a plurality of defraction beams.

U.S. Pat. No. 4,311,383, issued to Ohtsubo discloses a method of determining velocity by relying on the "speckle patterns" created by a laser reflecting from a spinning disk with surface roughness.

SUMMARY OF THE PRESENT INVENTION

An object of this invention is to provide a calibration velocity reference and a calibration method for use with laser Doppler velocimeters and especially those capable of simultaneously measuring several components of velocity.

Another object of this invention is to provide a calibration apparatus and method that are easy to use and give accurate results on multi-dimensional laser Doppler velocimeters or velocimeters with complicated geometrical arrangements capable of measuring several components of velocity.

A further object of this invention is to provide a laser Doppler velocimeter calibration device that generates a low distortion signal with a good signal-to-noise ratio.

Still another object of this invention is to provide a disk calibrator for laser Doppler velocimeters that produces accurate results when the velocimeter laser beam pairs are normal or oblique to the disk.

These and other objects of the invention will become apparent to those skilled in the art.

This method provides a method and apparatus for calibrating laser Doppler velocimeters. Multidimensional velocimeters typically have a plurality of pairs of laser beams having different wavelengths intersecting at the point where fluid velocity is to be measured. The invention is useful for the calibration of one-dimensional velocimeters as well as multidimensional velocimeters and throughout the specification it is to be understood that the invention applies to laser velocimeters with either single or multiple pair laser beams. Thus, any statements directed to plural laser beam pairs are not intended to imply that the velocimeter to be calibrated must have a multiplicity of laser beam pairs.

In accordance with the invention, laser beam pairs from a laser Doppler velocimeter are aimed at a rotatable disk. An optic fiber is threaded through the disk coincidentally to the axis of rotation. The disk is moved until the laser radiation through the optic fiber is maximized as registered by a light meter that detects light through the optic fiber. When the maximum is achieved, the laser beams are accurately centered on the disk. The disk comprises a hub section and a rim section which is supported by rigid spokes. Fine wires are tautly mounted in radial fashion across the gap between the hub and the rim. The disk is rotated at a precisely known angular velocity. After the laser beams are centered on the disk, the disk is moved a known precise distance by adjustable means until the measuring locus is at the gap and swept by the wires. Knowing the angular velocity of the disk and the radial distance between the disk center and impingement point of the beams, the tangential velocity of the wire at the impingement point may be easily derived using $$V_t = R\omega$$

where
$V_t$ = tangential velocity
$R$ = radial displacement, and
$\omega$ = angular velocity This apparatus has the advantage that the disk can be oriented at various angles with respect to a velocimeter that is being calibrated. A further advantage is that the exact velocity of the rotating wire can be determined to within one-tenth of a percent or better.

IN THE DRAWING

FIG. 1 is a side view of a two-channel laser Doppler velocimeter directing its beams on a spinning disk calibration apparatus in accordance with the invention;

FIG. 2 is a partially exploded view of the apparatus of this invention along with a schematic diagram of the circuitry; and FIG. 3 is a perspective view of the adjustable mechanism for moving the spinning disk relative to three orthogonal axes.

DETAILED DESCRIPTION OF THE PREFERRED EMBODIMENT

Referring to FIG. 1, a disk 10, rotated by motor 48, is situated so the measuring locus 12 of a two-channel backscatter laser Doppler velocimeter is between the hub 30 and the rim 32 of the disk. The laser Doppler velocimeter uses two laser beam pairs, pair 14, 18 having a first wavelength and a second pair 16, 20 having a different wavelength. The beam pairs are focused by zoom optics 22 and 24. Such a velocimeter is more completely disclosed in U.S. Pat. No. 3,860,342, issued to Orloff et al., May 31, 1977, and the publication is included herein by reference. This particular velocimeter requires calibration at the various ranges of focus because of the varying geometry of the beams. There are many other multi-channel laser Doppler velocimeters that require calibration, especially three-dimensional laser velocimeters which incorporate non-orthogonal beam arrangements.

FIG. 2 depicts the entire disk calibration system and shows it coupled to a velocimeter ready to be tested. Spinable disk 10 has an axis of rotation 31 and a hub portion 30. A rim portion 32 is separated from hub portion 30 and supported by rigid spokes 34. Gaps 36 are created between rim 32 and hub 30. Wires 38 radially bridge gaps 36. Each wire is tautly fastened between the rim portion and the hub portion. Disk 10 is secured to the output shaft 45 of an electric motor 48 having a highly regulated angular velocity. The motor may be, for example, a synchronous motor or a servo-controlled DC motor. A passageway 40 extends through the center of hub portion 30 and coincides with passageway 47 in the center of motor shaft 45. A fiber optic 42 is located in the passageways and extends from the forward face of disk 10 to the detection region of photodetector 50. A light meter 51 is coupled to the photodetector 50.

A bracket 43, adjustably attached to motor 48 by set screws, supports a spoke detector 46. The detector senses the arrival of each spoke in front of the detector and measures the velocity of the motor.

During calibration, the measuring locus of the velocimeter is situated between hub 30 and rim 32. As the disk rotates and the wires 38 pass through the laser radiation, the scattered light is detected by the velocimeter photodetector 23 and the analog data signal 52 is processed by velocity processor 25, which essentially counts the analog fringe data from raw analog data provided by the velocimeter photodetector. The digital data from the velocity processor can be further processed by a computer 26 for immediate or delayed display in a convenient format.

Spoke detector 46 controls the on time of velocity processor 25 and generates a signal for monitor 28 representative of the angular velocity of spinning disk 10. Detector 46 senses the presence of each spoke 34 in front of the detector and generates an enable pulse on line 27 for each spoke appearance. The detector includes an adjustable delay circuit for delaying the enable pulses. The delay is adjusted so that the velocity processor is operative only during the periods when a wire 38 sweeps through the laser beams. Thus, velocity measurements are inhibited when spokes 34 pass through the velocimeter laser beams. Any device that will reliably register the passage of a spoke is a candidate device for being a spoke detector. Detector 46 may, for example, comprise a radiation (IR, ultrasonic, etc.) transmitter directed at the spokes and a radiation receiver for receiving radiation reflected from the spokes. Alternatively, the spokes may be magnetized and detector 46 may comprise a magnetometer (Hall-effect or otherwise). The detector serves two functions. It measures the angular velocity of the disk and turns off the velocity processor when a wire is not in the measuring locus.

The spokes 34 preferably have a configuration that will deflect impinging laser radiation away from the sensitive velocimeter photodetector. This result may be achieved by utilizing a spoke with a triangular cross-section and orienting the spoke so that the spoke detector 46 views a flat face and the velocimeter sees a wedge formed by the other two converging faces. Additionally, it is preferred that at least the two spoke surfaces facing the velocimeter be polished to aid reflection of the impinging laser beams.

Wires 38 should be thin and have a diameter similar to the diameter of particles entrained in the fluid to be measured. Preferably, the wire diameter is between 3 and 7 microns. The thin wires are mounted as tautly as possible between hub portion 30 and rim portion 32 to minimize vibration as they are spun during calibration.

As stated previously, the laser beams that are to be calibrated are first aimed at the center of disk 10. Then the disk is moved until the beams pass through gaps between the disk hub and disk rim. It is essential that the distance the disk is moved be very accurately measured. An adjustable support apparatus 60 (FIGS. 2 and 3)

maintains the disk 10 in a fixed spatial relationship to the impinging laser beams from a laser Doppler velocimeter under test. Once the beams are precisely aimed at the center of disk 40, the support 60 enables the disk 10 to be moved with respect to the beams until the measuring locus of the beams impinges on gap region 36. Further, support 60 includes means for accurately measuring the radial distance that the disk is moved during the radial beam transversal from center 40 to gap 36.

Referring to FIG. 3, adjustable support 60 comprises two micrometer rotation stages 80, 90 and three micrometer translation stages 81, 82, 83, a platform 84 and a bracket 61. The end of motor 48 opposite disk 10 is secured to bracket 61 which in turn is fastened to portion 86 of translation stage 82. Portion 86 of stage 82 is linearly moved with respect to portion 87 when vernier knob 72 is rotated. The amount of movement of portion 86 of the stage (and movement of disk 10) may be accurately determined by reading the micrometer scale 88 on the knob. Translation stages 81 and 83 are equipped with similar knobs 74 and 86 and the stages are perpendicular to stage 82. The stages 80 and 90 always rotate within planes which are normal to each other.

Platform 84 is L-shaped. Base portion 98 of rotation stage 90 is secured to the vertically disposed segment of platform 84. The entire translation stage 82, and disk 10, may be rotated clockwise or counterclockwise with respect to base 98 by appropriate rotation of vernier knob 73. The amount of angular displacement may be accurately ascertained from a scale on knob 73. Rotation stage 80 is also equipped with a vernier knob 99 that performs similar functions. Platform 84 is secured to the upper section 91 of translation stage 81 by means of set screws 76. Rotation of vernier knob 74 causes the linear motion of section 91 (and disk 10) with respect to lower section 92 of stage 81. In the drawing, the motion of section 91 will be either to the left or right depending on the direction that knob 74 is turned.

Translation stage 81 is securely mounted on a turntable 97 of rotational stage 80 whereas the lower part of stage 80 is rigidly attached to upper portion 101 of translation stage 83. The rotation of knob 99 controls the rotation of turntable 97 and all of the apparatus mounted thereon such as disk 10. The rotation of knob 86 causes upper section 101 of stage 83, and disk 10, to be linearly moved with respect to lowersection 102. For the calibration of some velocimeters it may be convenient to mount support 60 on a tripod or a bench. The adjustable support 60 allows precise orientation of the spinning disk so that multifarious laser beam angles may be accommodated by the disk and even very complex three- dimensional laser Doppler velocimeters may be accurately calibrated.

It should be apparent from the drawing that for one specific position of rotation stage 80 and one specific position of rotation stage 90, the motion axes of translation stages 81 and 82 will be arranged orthogonally and the motion of each stage will be in the plane of the disc face.

In operation, the laser beams from the velocimeter to be calibrated are aimed at passageway 40 at the center of disk 10. Previously the appropriate stages are moved until the beams are approximately normal to the plane defined by the disk. While the light meter 51 is monitored (not shown in FIG. 3.) the pertinent stages (mainly translation stages 81 and 82) are carefully moved until the light meter reads a maximum, indicating that the measuring locus of the laser beams is at the disk center. Then the disk is translated along any desired radius until the measuring locus reaches gap 36. The translation may be accomplished by moving stage 81 or stage 82 or both of the stages. The precise distance that the disk is moved (to change the measuring locus impingement point from disk center to gap 36) is derived from the appropriate micrometer vernier. This distance is actually radius R in the above-mentioned velocity formula. With the velocimeter measuring locus in gap 36, the disk 10 is rotated by motor 48. The disk velocity ($\omega$) is noted on monitor 28. $V_t$ is solved for in velocity equation $$V_t = R\omega$$

and $V_t$ is compared with the velocimeter velocity reading to determine the accuracy of the velocimeter reading.

In one test model of the subject invention, the reference velocity error was only 0.1% and the velocity direction error was kept to 0.1 degree. The model utilized a five-inch diameter disk with wires mounted on a two-inch radius. A 3600 RPM synchronous motor was used for motor 48. All of the rotation stages were accurate to 0.1 degree and all translation stages were accurate to 0.001 inches.

As will be clear to those skilled in the art, alterations and modifications may be made to the disclosed embodiment without departing from the inventive concepts thereof. The above description is therefore intended as illustrative and informative, but not limiting in scope. Accordingly, it is intended that the following claims be interpreted as covering all such alterations and modifications that reasonably fall within the true spirit and scope of the invention.

What is claimed is:

1. Apparatus for calibrating a laser Doppler velocimeter having at least one pair of intersecting laser beams that form a measuring locus comprising:
   a disk having a hub portion, a rim portion separated from said hub portion and a plurality of fine taut wires radially extending between said hub portion and said rim portion;
   means for rotating said disk; and
   means for determining when said measuring focus is coincident with the center of said disk.

2. The apparatus of claim 1 including means for moving said disk a known amount with respect to said measuring locus so that said measuring locus is moved from the center of said disk to a site where it is swept by said wires.

3. The apparatus of claim 2 wherein said moving means includes at least one micrometer translation stage.

4. The apparatus of claim 1 wherein a plurality of rigid spokes extend between said hub portion and said rim portion, and the surfaces of said spokes that are adapted to face said velocimeter are laser radiation reflective.

5. The apparatus of claim 4 including means for detecting the arrival of each spoke at a predetermined location.

6. The apparatus of claim 5 wherein said detecting means further generates repetitive pulses for periodically enabling the velocity processor of said velocimeter.

7. Apparatus as set forth in claim 6 wherein each pulse occurs when a wire sweeps through said measuring focus.

8. The apparatus of claim 1 wherein said determining means includes a photodetector.

9. The apparatus of claim 1 wherein said determining means includes a fiber optic threaded through a passageway in the center of said disk and a photodetector for sensing the amount of laser radiation channeled through said fiber optic.

10. A method for calibrating a laser Doppler velocimeter having at least one pair of intersecting laser beams that form a measuring locus, said method comprising:
centering said measuring locus on the center of a disk spinning at velocity $\omega$ and having peripherally disposed objects that simulate particulate matter;
moving the disk radially until the measuring locus is swept by said objects;
measuring the distance R moved by the disk and solving for the tangential velocity $V_t$ of the objects using the formula $V_t = R\omega$.

11. A method for calibrating a laser Doppler velocimeter having at least one pair of intersecting laser beams that form a measuring locus, said method comprising:
centering said measuring locus on the center of a hub of a spinable disk having a centrally located aperture by positioning said measuring locus until the laser radiation transmitted through said aperture is maximized;
spinning the disk at a known velocity $\omega$;
moving the disk radially until the measuring locus is swept by taut radially disposed wires located at the periphery of the disk;
measuring the distance R moved by the disk and solving for the tangential velocity $V_t$ of the wires using the formula $V_t = R\omega$.

* * * * *